US008018686B2

(12) United States Patent
Yao

(10) Patent No.: US 8,018,686 B2
(45) Date of Patent: Sep. 13, 2011

(54) HEAD GIMBAL ASSEMBLY FOR USE IN DISK DRIVE DEVICES AND METHOD OF MAKING THE SAME

(75) Inventor: MingGao Yao, Dongguan (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 833 days.

(21) Appl. No.: 11/640,411

(22) Filed: Dec. 18, 2006

(65) Prior Publication Data

US 2008/0144224 A1 Jun. 19, 2008

(51) Int. Cl.
*G11B 5/48* (2006.01)
*G11B 21/16* (2006.01)
(52) U.S. Cl. ............... 360/245.5; 360/245; 360/294.4
(58) Field of Classification Search .............. 360/264.2, 360/245, 245.3–245.6, 294.4
See application file for complete search history.

(56) References Cited

U.S. PATENT DOCUMENTS

| 5,315,454 | A | * | 5/1994 | Fukakusa | 360/75 |
| 5,557,488 | A | * | 9/1996 | Hamilton et al. | 360/245.9 |
| 6,671,131 | B2 | | 12/2003 | Kasajima et al. | |
| 6,680,826 | B2 | * | 1/2004 | Shiraishi et al. | 360/294.4 |
| 6,700,749 | B2 | | 3/2004 | Shiraishi et al. | |
| 2002/0051326 | A1 | * | 5/2002 | Shiraishi et al. | 360/294.4 |
| 2003/0168935 | A1 | * | 9/2003 | Ogawa et al. | 310/328 |
| 2006/0072247 | A1 | * | 4/2006 | Yao et al. | 360/294.4 |
| 2006/0082917 | A1 | * | 4/2006 | Yao et al. | 360/75 |

FOREIGN PATENT DOCUMENTS

JP  2002-133803  5/2002

* cited by examiner

*Primary Examiner* — Craig A. Renner
*Assistant Examiner* — Adam B Dravininkas
(74) *Attorney, Agent, or Firm* — Nixon & Vanderhye PC

(57) ABSTRACT

Systems and methods for accurate position adjustment of thin-film PZT micro-actuators are provided. In certain example embodiments, a head gimbal assembly is provided. A suspension includes a suspension flexure located at one end of the suspension, and the suspension flexure includes a tongue region. At least one micro-actuator is mounted to a micro-actuator mounting region of the tongue region of the suspension flexure. Any gap between the slider and the at least one micro-actuator may be reduced and/or eliminated. A slider is substantially fully mounted on an insulating layer, and the insulating layer separates the slider from the at least one micro-actuator. The suspension flexure may be located substantially fully underneath the slider, and the tongue region of the suspension flexure may be substantially equally weighted around a dimple formed on the suspension. The rigidity of the suspension flexure may be increased by one or more supports formed thereon.

17 Claims, 15 Drawing Sheets

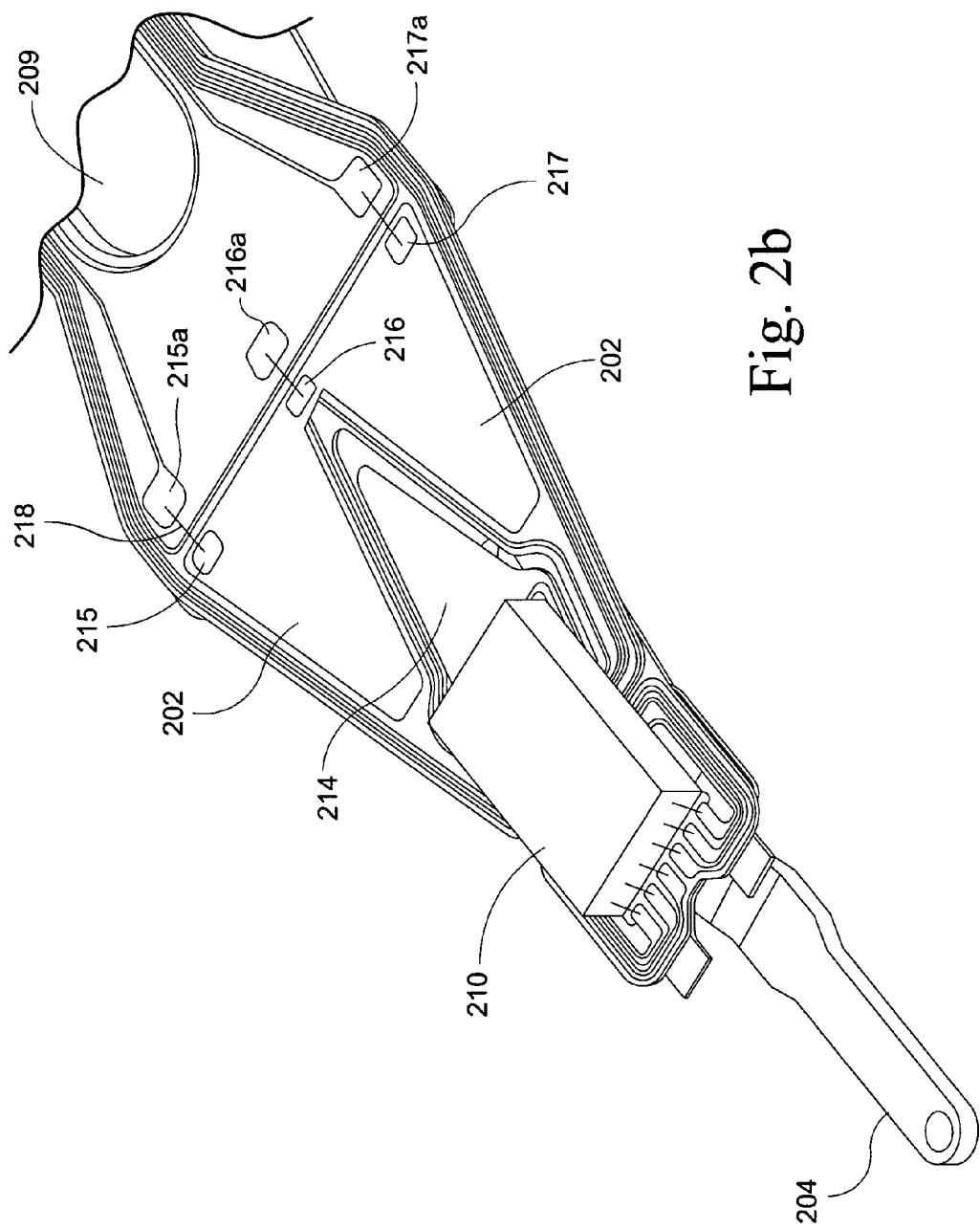

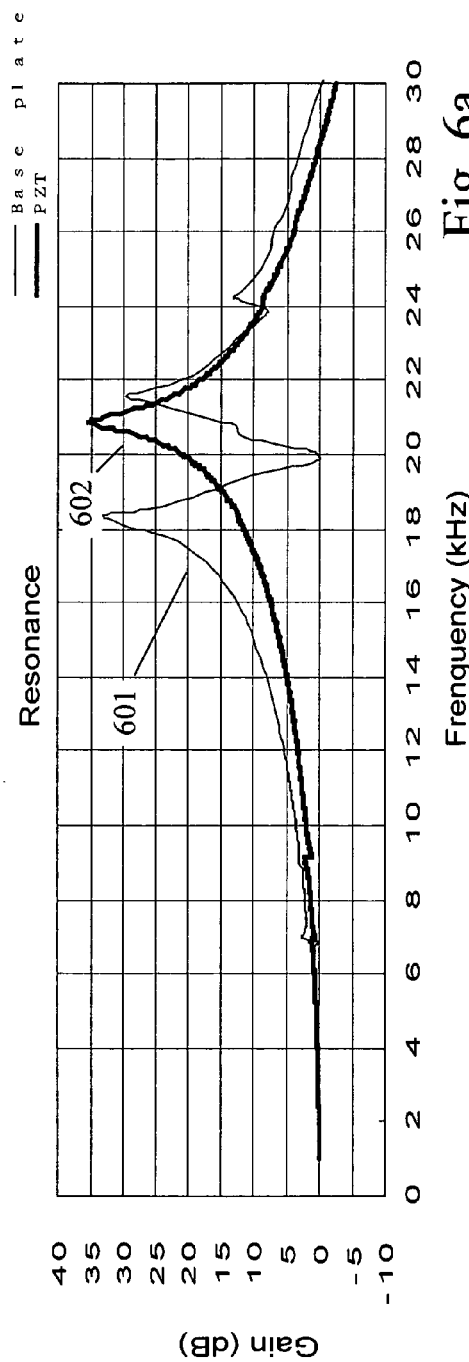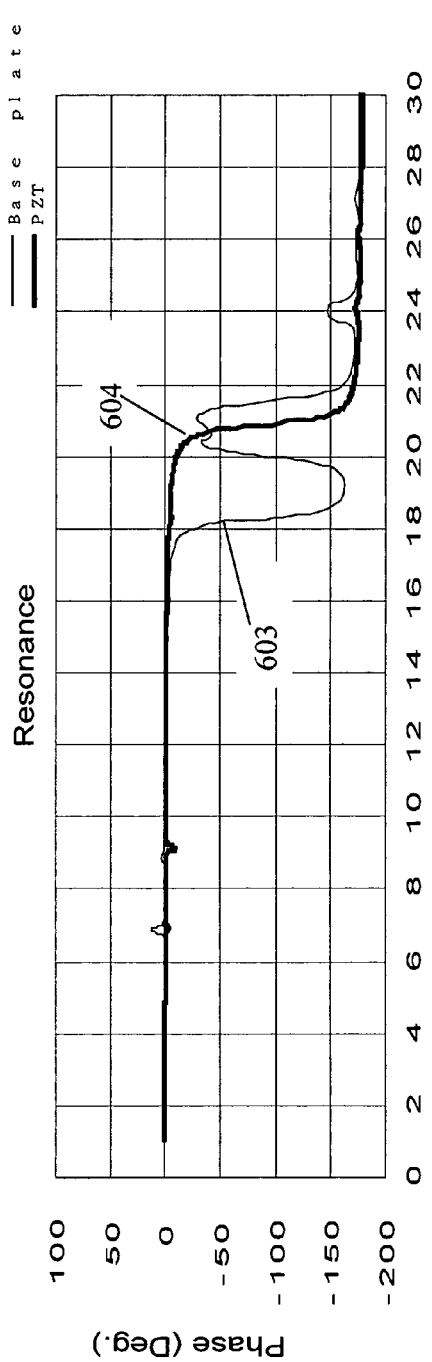

HEAD GIMBAL ASSEMBLY FOR USE IN DISK DRIVE DEVICES AND METHOD OF MAKING THE SAME

FIELD OF THE INVENTION

The example embodiments herein relate to information recording disk drive devices and, more particularly, to improved head gimbal assemblies (HGAs) that allow for more accurate position adjustment of thin-film PZT micro-actuators, and/or methods of making the same.

BACKGROUND OF THE INVENTION

One known type of information storage device is a disk drive device that uses magnetic media to store data and a movable read/write head that is positioned over the media to selectively read from or write to the disk.

Consumers are constantly desiring greater storage capacity for such disk drive devices, as well as faster and more accurate reading and writing operations. Thus, disk drive manufacturers have continued to develop higher capacity disk drives by, for example, increasing the density of the information tracks on the disks by using a narrower track width and/or a narrower track pitch. However, each increase in track density requires that the disk drive device have a corresponding increase in the positional control of the read/write head in order to enable quick and accurate reading and writing operations using the higher density disks. As track density increases, it becomes more and more difficult using known technology to quickly and accurately position the read/write head over the desired information tracks on the storage media. Thus, disk drive manufacturers are constantly seeking ways to improve the positional control of the read/write head in order to take advantage of the continual increases in track density.

One approach that has been effectively used by disk drive manufacturers to improve the positional control of read/write heads for higher density disks is to employ a secondary actuator, known as a micro-actuator, that works in conjunction with a primary actuator to enable quick and accurate positional control for the read/write head. Disk drives that incorporate micro-actuators are known as dual-stage actuator systems.

Various dual-stage actuator systems have been developed in the past for the purpose of increasing the access speed and fine tuning the position of the read/write head over the desired tracks on high density storage media. Such dual-stage actuator systems typically include a primary voice-coil motor (VCM) actuator and a secondary micro-actuator, such as a PZT element micro-actuator. The VCM actuator is controlled by a servo control system that rotates the actuator arm that supports the read/write head to position the read/write head over the desired information track on the storage media. The PZT element micro-actuator is used in conjunction with the VCM actuator for the purpose of increasing the positioning access speed and fine tuning the exact position of the read/write head over the desired track. Thus, the VCM actuator makes larger adjustments to the position of the read/write head, while the PZT element micro-actuator makes smaller adjustments that fine tune the position of the read/write head relative to the storage media. In conjunction, the VCM actuator and the PZT element micro-actuator enable information to be efficiently and accurately written to and read from high density storage media.

One known type of micro-actuator incorporates PZT elements for causing fine positional adjustments of the read/write head. Such PZT micro-actuators include associated electronics that are operable to excite the PZT elements on the micro-actuator to selectively cause expansion and/or contraction thereof. The PZT micro-actuator is configured such that expansion and/or contraction of the PZT elements causes movement of the micro-actuator which, in turn, causes movement of the read/write head. This movement is used to make faster and finer adjustments to the position of the read/write head, as compared to a disk drive unit that uses only a VCM actuator. Exemplary PZT micro-actuators are disclosed in, for example, JP 2002-133803; U.S. Pat. Nos. 6,671,131 and 6,700,749; and U.S. Publication No. 2003/0168935, the contents of each of which are incorporated herein by reference.

FIG. 1a illustrates a conventional disk drive unit and show a magnetic disk 101 mounted on a spindle motor 102 for spinning the disk 101. A voice coil motor arm 104 carries a head gimbal assembly (HGA) that includes a micro-actuator 105 with a slider incorporating a read/write head 103. A voice-coil motor (VCM) is provided for controlling the motion of the motor arm 104 and, in turn, controlling the slider to move from track to track across the surface of the disk 101, thereby enabling the read/write head 103 to read data from or write data to the disk 101.

Because of the inherent tolerances (e.g., dynamic play) of the VCM and the head suspension assembly, the slider cannot achieve quick and fine position control, which adversely impacts the ability of the read/write head to accurately read data from and write data to the disk when only a servo motor system is used. As a result, a PZT micro-actuator 105, as described above, is provided in order to improve the positional control of the slider and the read/write head 103. More particularly, the PZT micro-actuator 105 corrects the displacement of the slider on a much smaller scale, as compared to the VCM, in order to compensate for the resonance tolerance of the VCM and/or head suspension assembly. The micro-actuator enables, for example, the use of a smaller recording track pitch, and can increase the "tracks-per-inch" (TPI) value for the disk drive unit, as well as provide an advantageous reduction in the head seeking and settling time. Thus, the PZT micro-actuator 105 enables the disk drive device to have a significant increase in the surface recording density of the information storage disks used therein.

FIGS. 1b-d are various views of a typical PZT micro-actuator and support structure. In particular, FIG. 1b is an exploded partial perspective view of a PZT element micro-actuator and support arm, FIG. 1c is a top view of the PZT element micro-actuator and support arm of FIG. 1b, and FIG. 1d is a side view of the PZT element micro-actuator and support arm of FIG. 1b. According to the techniques disclosed in U.S. Publication No. 2003/0168935, a slider 103 having a read/write sensor is partially mounted on the slider support 121 of the suspension. A bump 127 is formed on the slider support 121 to support the center of the back surface of the slider. A flex cable 122 with multiple traces operably couples the slider support 121 and a metal base flexure parts 123. A suspension load beam 124 with a dimple 125 supports the slider support 121 and flexure parts 123. The slider 103 is partially mounted on the top of the flexure 107. The dimple 125 of the suspension load beam supports the bump 127 of the slider support, which keeps the load force from the load beam 124 applied to the center of the slider when the head is flying over the disk. There are two thin-film PZT pieces 10 attached to the tongue region 128 of the suspension and is at least partially underneath the slider. A parallel gap 111 exists between the back side of the slider and the top surface of the PZT element. When a voltage is applied to the thin film PZT pieces 10, one of the two PZT pieces may contract (as shown by arrows D), and the other side may expand (as shown by arrows E). This generates a rotation torque with respect to the slider support (as shown by arrow C). Because the slider 103 is partially mounted on the slider support 121 and the bump 127, a parallel gap 111 exists between the slider and the thin-film PZT elements.

Normally, the slider will rotate against the dimple 125. Unfortunately, when a vertical vibration or other shock occurs (e.g. when a "tilt-drop" shock occurs), the slider is rotated against the dimple and the leading edge of the slider may hit the PZT element. The PZT element may suffer damage, such as, for example, a crack or a break. This arrangement thus raises reliability concerns, for example, with respect to the PZT elements.

FIG. 1e, which is a side-view of the tongue area of the HGA during a shock, demonstrates this problem. In particular, the slider rotates against the dimple. Its leading edge tilts, and it comes into contract with the thin-film PZT element 10 in the region 130. This contact, brought about by the occurrence of a shock for example, may damage the thin-film PZT element. For example, because the edge portion of the slider 103 is sharp, the region 130 in the PZT element surface may crack or become scratched, especially because it formed from, for example, a thin-film material. Accordingly, the PZT element will be damaged.

Thus it will be appreciated that there is a need in the art for micro-actuators, head gimbal assemblies, disk drives, and methods for making the same that overcome one or more of these and/or other disadvantages.

SUMMARY OF THE INVENTION

One aspect of certain example embodiments described herein relates to the reduction and/or elimination of the gap between the slider and the suspension tongue.

Another aspect of certain example embodiments described herein relates to the reduction of the size of suspension tongue region and/or the PZT element(s).

Yet another aspect of certain example embodiments described herein relates to change in PZT element mount location(s), optionally including providing a substantially full mounting insulator between the PZT element(s) and the slider.

Still another aspect of certain example embodiments described herein relates to substantially balanced weight between the head and tail portions of the tongue region of the suspension flexure.

It will be appreciated that these aspect may be used separately or in various combinations, all of which may help to improve overall performance.

In certain example embodiments, a head gimbal assembly is provided. A suspension may include a suspension flexure located at one end of the suspension, and the suspension flexure may include a tongue region with a top region and a bottom region. At least one micro-actuator may be mounted to a micro-actuator mounting region of the tongue region of the suspension flexure. A slider having a leading edge and a trailing edge may be substantially fully mounted on an insulating layer of the suspension tongue region such that the leading edge of the slider is mounted on the bottom region of the tongue region and the trailing edge of the slider is mounted on the top region of the tongue region.

In certain other example embodiments, a disk drive device is provided. Such disk drive devices may comprise a head gimbal assembly; a drive arm connected to the head gimbal assembly; a disk; and, a spindle motor operable to spin the disk. The head gimbal assembly may include a suspension which, in turn, may include a suspension flexure located at one end of the suspension, and the suspension flexure may include a tongue region with a top region and a bottom region. At least one micro-actuator may be mounted to a micro-actuator mounting region of the tongue region of the suspension flexure. A slider having a leading edge and a trailing edge may be substantially fully mounted on an insulating layer of the suspension tongue region such that the leading edge of the slider is mounted on the bottom region of the tongue region and the trailing edge of the slider is mounted on the top region of the tongue region.

According to certain example embodiments, a method of making a head gimbal assembly is provided. A suspension may be provided. A suspension flexure may be mounted onto one end of the suspension, and the suspension flexure may include a tongue region with a top region and a bottom region. At least one micro-actuator may be attached to a micro-actuator mounting region of the tongue region of the suspension flexure. A slider having a leading edge and a trailing edge may be substantially fully mounted on an insulating layer, with the leading edge of the slider being mounted on the bottom region of the tongue region and the trailing edge of the slider being mounted on the top region of the tongue region.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings:

FIG. 2b is a more detailed view of the tongue region of FIG. 2a, in accordance with an example embodiment;

FIGS. 6a and 6b show resonance testing data taken from certain example embodiments;

DETAILED DESCRIPTION OF ILLUSTRATED EMBODIMENTS

A conventional HGA has a large suspension tongue region and requires a parallel gap. However, as noted above, this arrangement enables the PZT element(s) to be damaged easily. Accordingly, certain example embodiments may reduce the size of the tongue region, reduce and/or eliminate the need for a gap, and/or provide performance even when shocks occur.

Figure 2A:
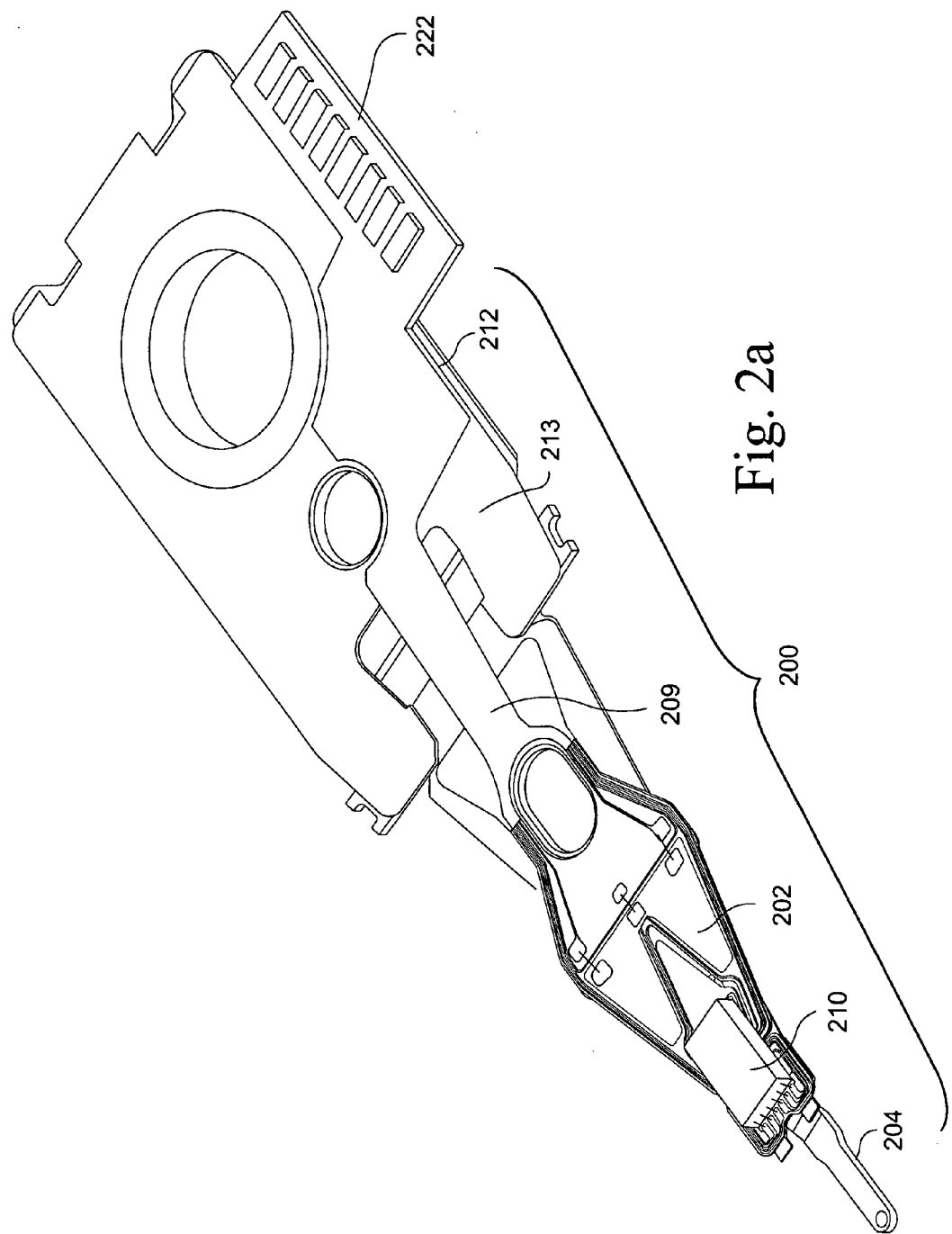
FIG. 2a is a perspective view of an HGA having a thin-film PZT micro-actuator, in accordance with an example embodiment.

FIG. 2*a* is a perspective view of an HGA having a thin-film PZT micro-actuator, in accordance with an example embodiment. The HGA 200 of FIG. 2*a* includes a load beam 204, a flexure 209, a hinge 213, and a base plate 212. A slider 210 is at least partially mounted on the top region of the tongue of the flexure 209 and bottom region of the tongue of the flexure 209. There are two PZT elements 202 mounted on the middle region of the flexure 209.

Figure 1A:
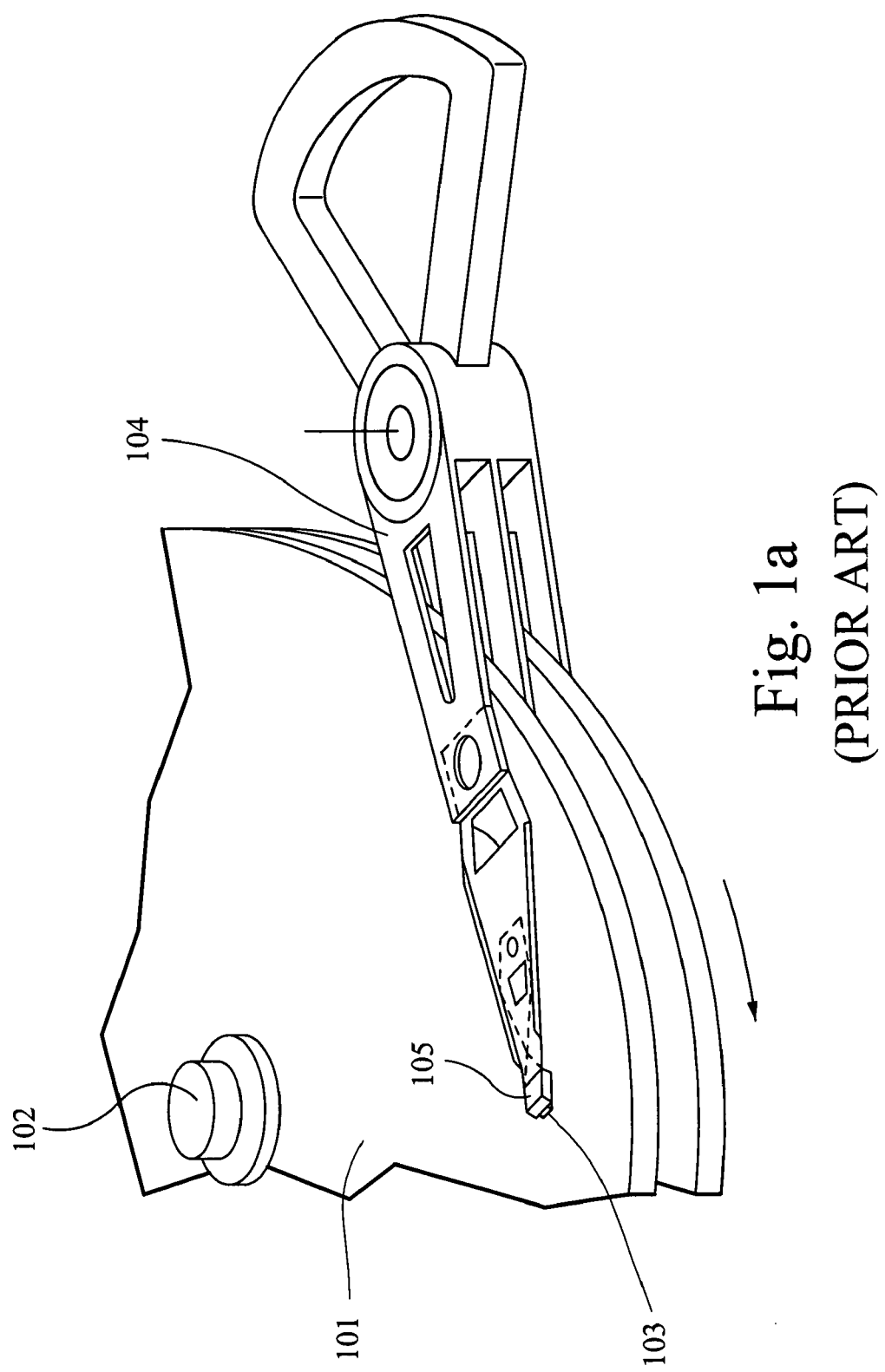
FIG. 1a is a partial perspective view of a conventional disk drive unit.
Figure 1B:
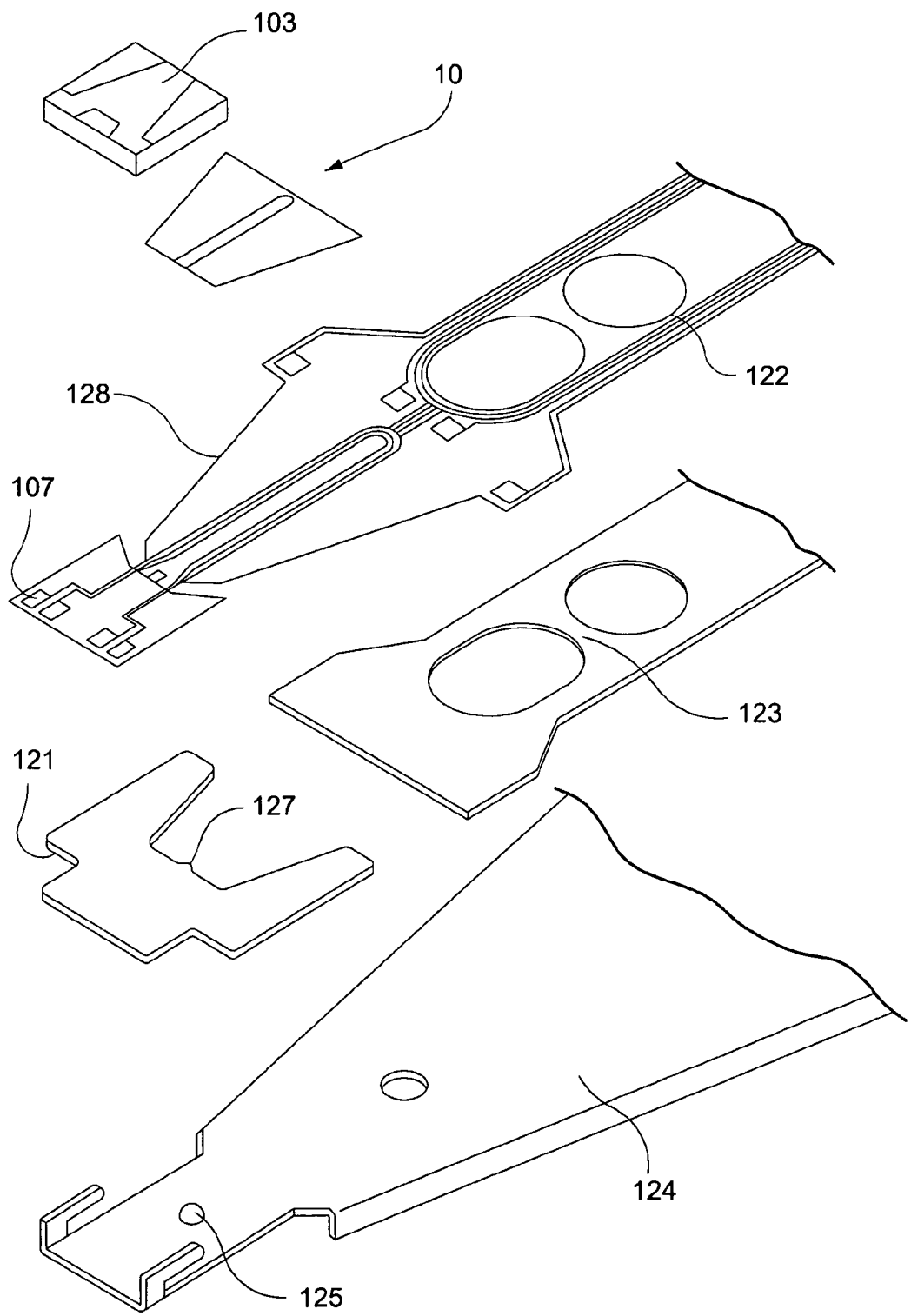
FIG. 1b is an exploded partial perspective view of a PZT element micro-actuator and support arm.
Figure 1C:
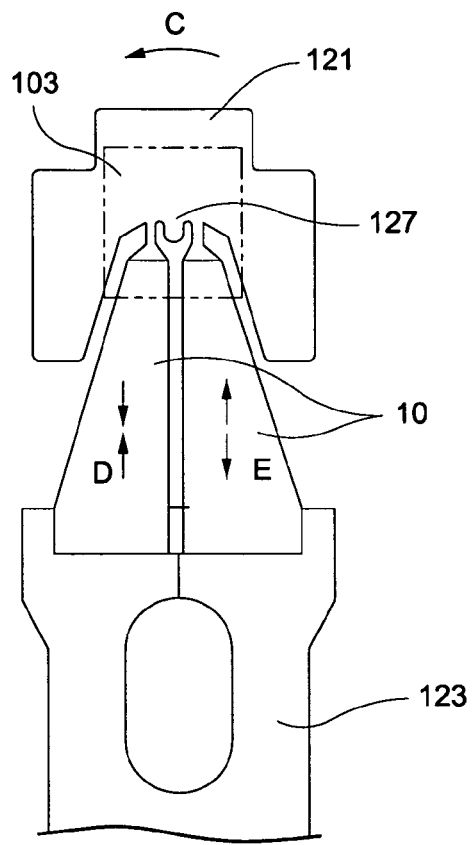
FIG. 1c is a top view of the PZT element micro-actuator and support arm of FIG. 1b.
Figure 1D:
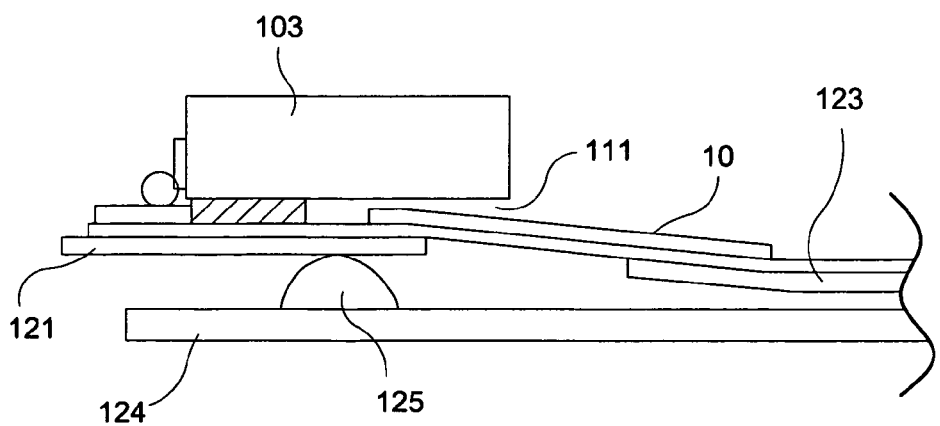
FIG. 1d is a side view of the PZT element micro-actuator and support arm of FIG. 1b.
Figure 1E:
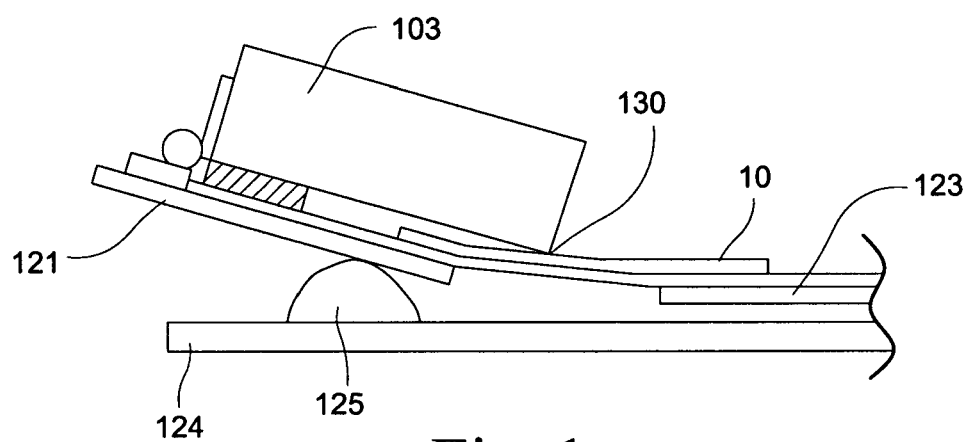
FIG. 1e is a side-view of the tongue area of the HGA during a shock.
Figure 2C:
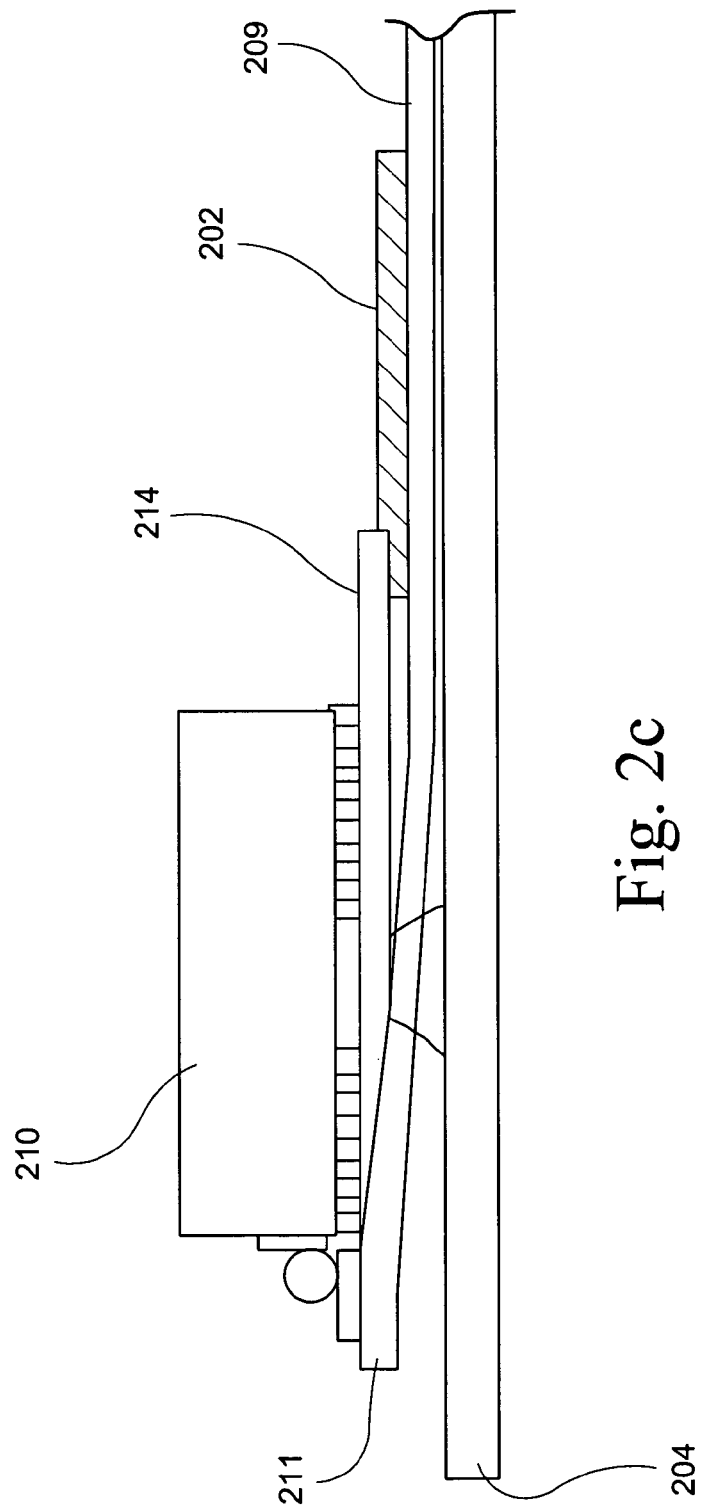
FIG. 2c is a side view of the tongue region of FIG. 2a, in accordance with an example embodiment.

FIG. 2*b* is a more detailed view of the tongue region of FIG. 2*a*, in accordance with an example embodiment; and FIG. 2*c* is a side view of the tongue region of FIG. 2*a*, in accordance with an example embodiment. The slider 210 is at least partially mounted on the top region 211 of the tongue of the flexure and bottom region 214 of the tongue of the flexure (e.g. by an epoxy). There are two PZT elements 202, which are substantially trapezoidally shaped, mounted on the middle of the flexure. Each PZT element has an associated electric pad 215/217. There also is a common ground pad 216. The suspension also has electric pads 215*a*/217*a*, which are electrically coupled with the pads 222. Electrical bonding 218 may be in the form of, for example, wire bonding or soldering ball bonding (SBB), to electrically couple the PZT elements with the suspension. The ground 216 is similarly connected to the flexure at ground 216*a*. There is no gap between the slider's leading edge and the PZT element (e.g. as shown in the prior art arrangement of FIG. 1*d*). This new arrangement may improve the performance of the HGA as a whole when shocks occur. Also, the weight advantageously is approximately balanced around the dimple.

Of course, it will be appreciated that the sizes and shapes of the PZT elements are given by way of example and without limitation. Also, the present invention is not limited to exactly two PZT elements. For example, as described more fully below, the techniques disclosed herein could be applied to HGAs having a single PZT element.

Figure 3A:
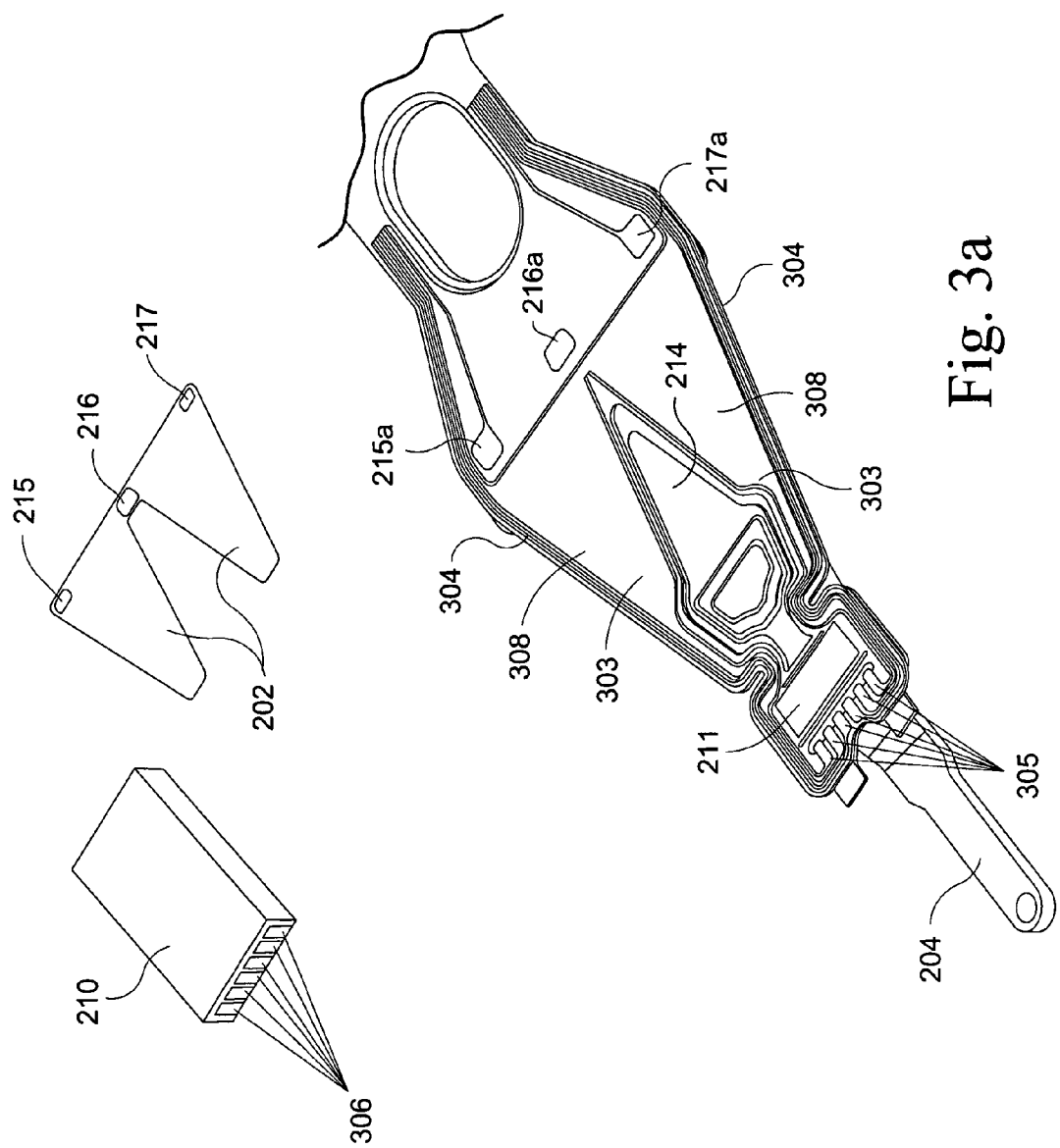
FIG. 3a is an exploded perspective view of the tongue region of an HGA, in accordance with an example embodiment.

FIG. 3*a* is an exploded perspective view of the tongue region of an HGA, in accordance with an example embodiment. The suspension tongue region includes a top region 211 and a bottom region 214. The top region 211 is coupled to the bottom region 214 at a weak point in its center. There are multiple pads 305 located on the top region of the tongue, which may be electrically coupled to the slider pads 306. The traces 304 are substantially symmetrically shaped, are located around the tongue and also curve around the weak point in the middle of the suspension tongue region, and may be operably connected to the pads 222 at the end of the flexure. The trailing edge of the slider 210 may be mounted on the top region 211, and the leading edge of the slider may be mounted on the bottom region 214. The two PZT elements 202, which have a common ground pad 216, are mounted to the suspension flexure PZT attachment region 308. The PZT attachment region 308 is separated from the bottom region 214, and it is operably coupled to the suspension tongue in its weak point through the traces and the polymer of the flexure. The PZT attachment region is supported by a suspension flexure (e.g. a polymer layer with a stainless steel support).

Figure 3B:
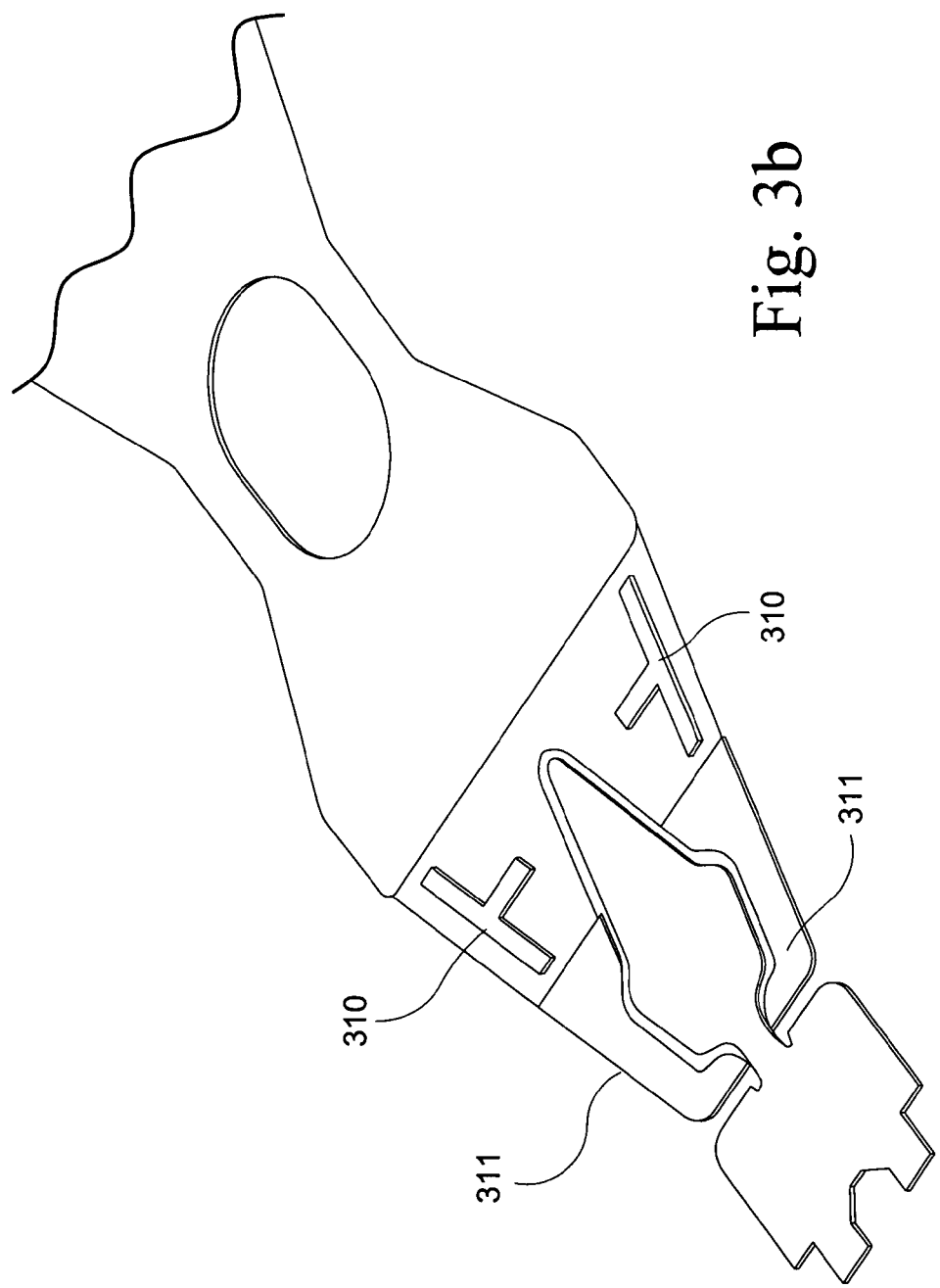
FIG. 3b is the underside of the tongue region of FIG. 3a, in accordance with an example embodiment.

The two trigger regions 303 are operably coupled to the PZT attachment region, and the top region of the flexure 211 is shaped substantially symmetrically around the dimple. The trigger regions may have structures mounted and/or formed thereon to maintain the flexibility and/or rigidity of the PZT elements while also transferring the rotational moment generated to the suspension tongue. Such structures may be located on the underside of the tongue region, as shown in FIG. 3*b*, which is the underside of the tongue region of FIG. 3*a*, in accordance with an example embodiment. Such structures 310, 311 may be of the type shown in FIG. 3*b*, and may be formed from, for example, a stainless steel layer formed on a base polymer layer, a copper layer covered by a polymer layer, etc. It will be appreciated that other shapes and/or materials may be used in addition to, or in place of, those shown in FIG. 3*b*.

Figure 4A:
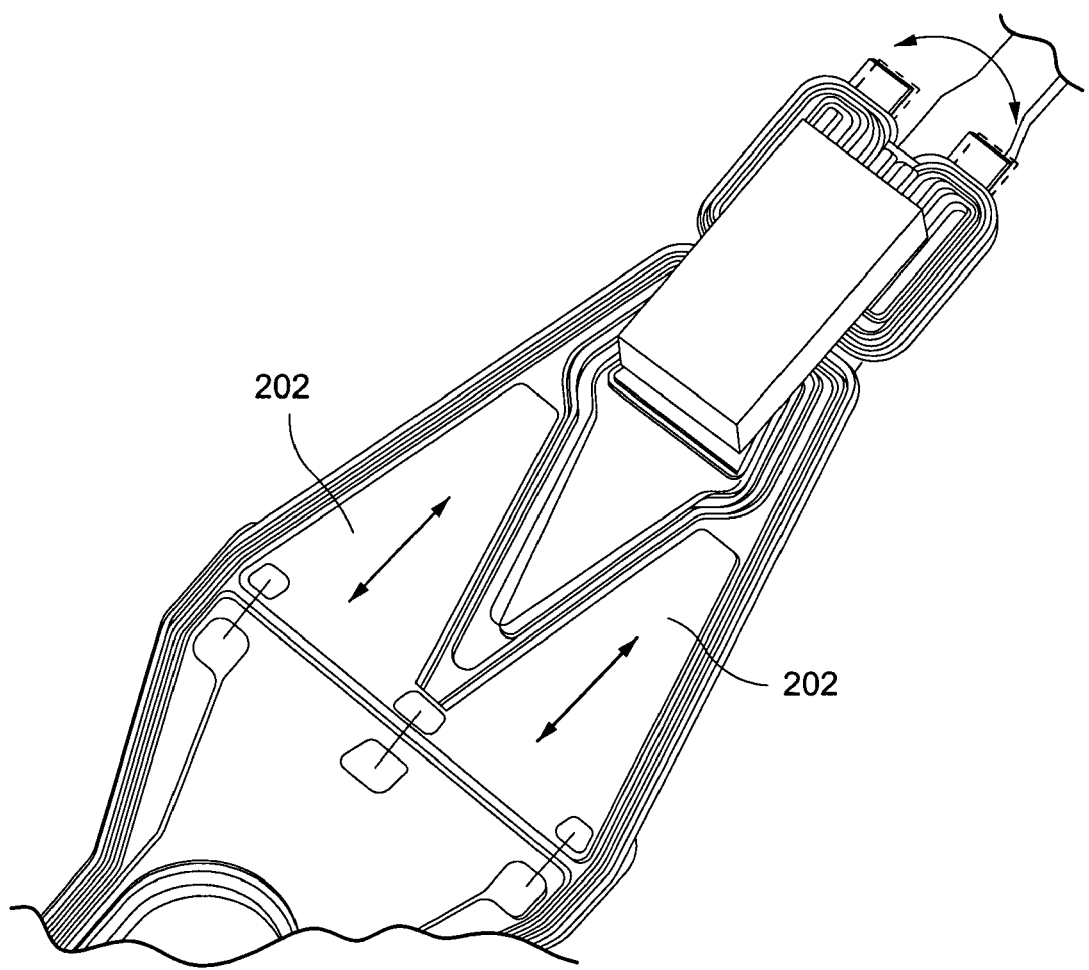
FIG. 4a helps explain the operational concept behind PZT element micro-actuation.

FIG. 4*a* helps explain the operational concept behind PZT element micro-actuation. When a voltage is input to one of the PZT elements 202, one side will contract and the other side will expand. In particular, the arrows in the PZT elements 202 show the directions in which the PZT elements should expand and contract. This generates a rotational torque, causing finely controlled movement. More particularly, because the two PZT elements 202 are operably coupled substantially symmetrically around the dimple through the out trigger, the torque will cause the slider to rotate together with the suspension tongue because the slider is mounted on the tongue. The arrows above the slider show the direction of movement of the full assembly caused by the rotational torque.

Figure 4B:
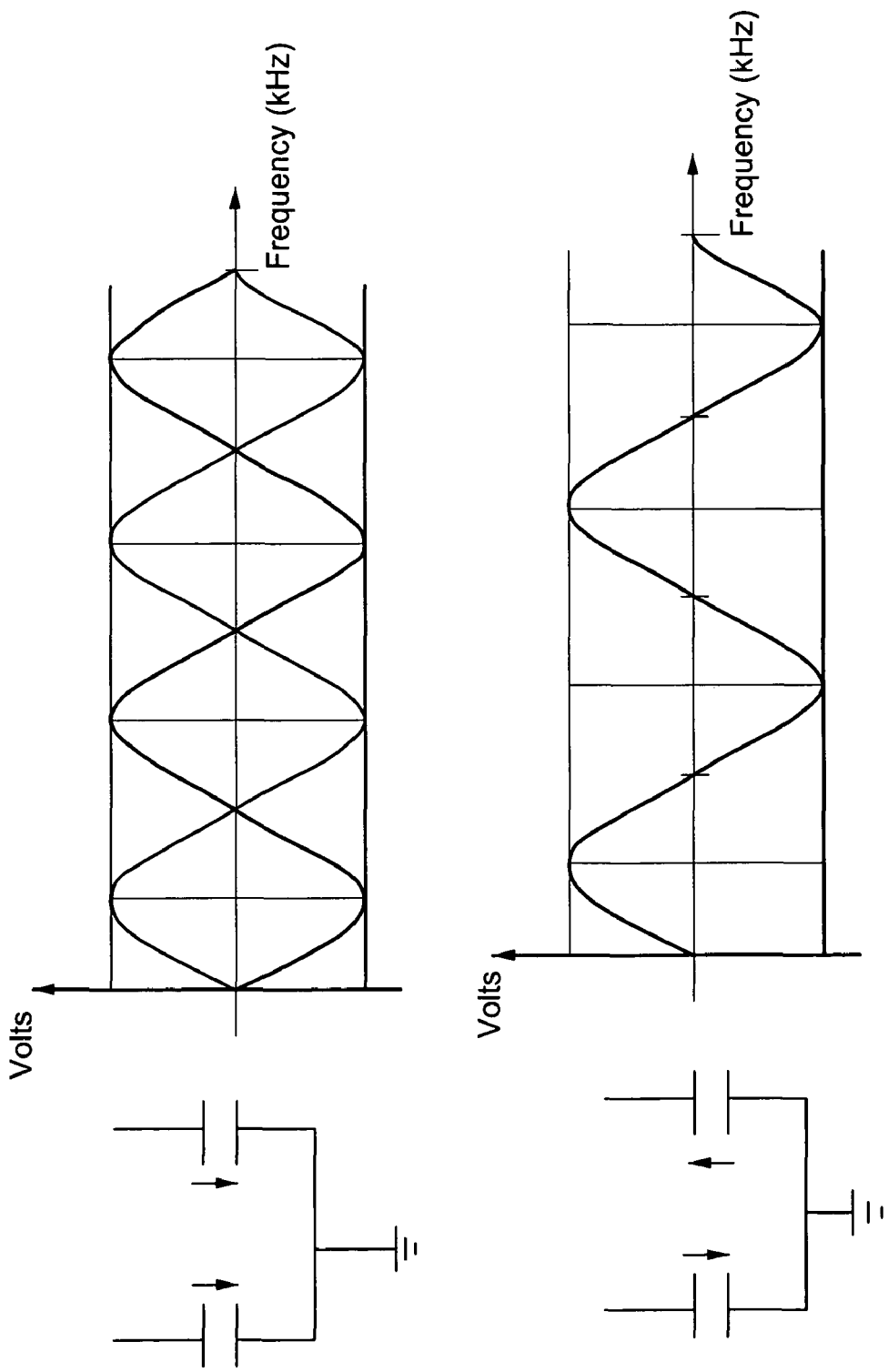
FIG. 4b shows two illustrative methods of operating the PZT micro-actuator.

FIG. 4*b* shows two illustrative methods of operating the PZT micro-actuator. The upper-left drawing shows a circuit diagram in which two voltages are applied to two PZT elements having the same polarization direction and a common ground, and the upper-right figure shows the corresponding voltage waveforms when two opposite phase sine voltages are applied. This arrangement will gradually cause the PZT elements (and, in turn, the head) to move left and return to the center during the first half-period, and move right and return to center during the second half-period. In the bottom example, the PZT elements have opposite polarization directions and have a common ground. Under the drive of the sine voltage, during the first half-period, one PZT element will expand to its largest position while the other PZT element contracts to its smallest position, and both will return to center. The opposite will happen during the second half-period. It will be appreciated that these examples are given by way illustration and without limitation. For example, other polarities, configurations, voltage waves, etc. may be used with the techniques disclosed herein.

Figure 5A:
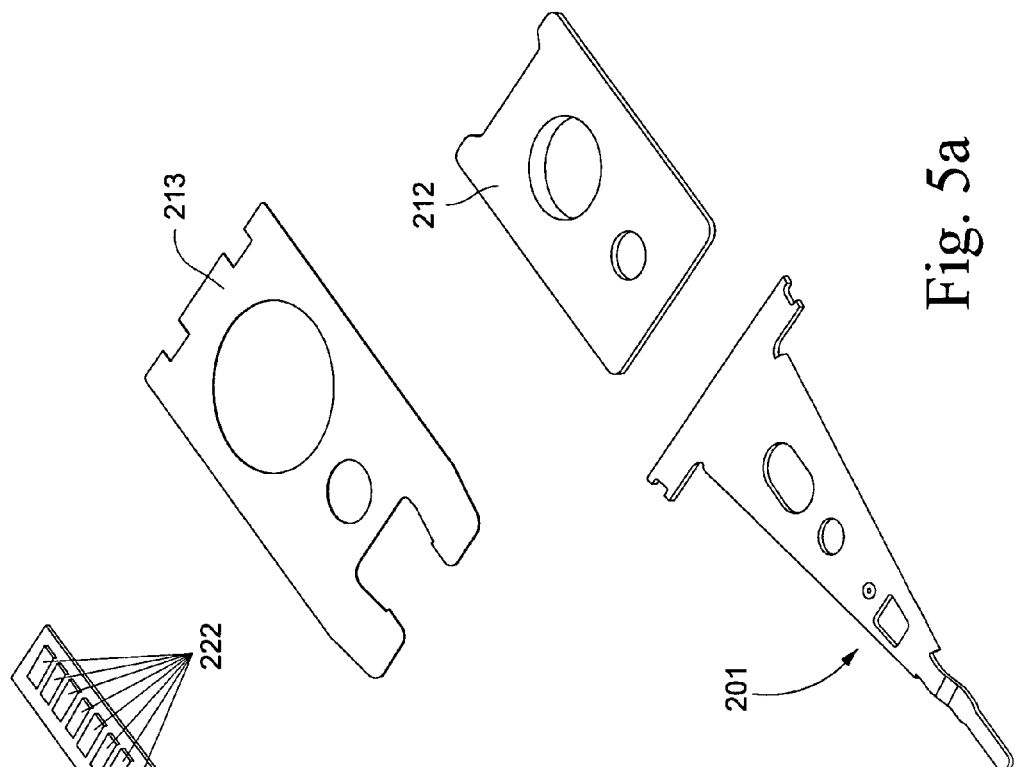
FIG. 5a is an exploded partial perspective view of an HGA, in accordance with an example embodiment.

FIG. 5*a* is an exploded partial perspective view of an HGA, in accordance with an example embodiment. A load beam 201 is provided, and a base plate 212 is mounted thereon. A hinge 203 is provided between the base plate 212 and the upper portion of the HGA that includes the top regions 211, 214 (on which slider 210 is at least partially mounted), PZT elements 202, and pads 222.

Figure 5B:
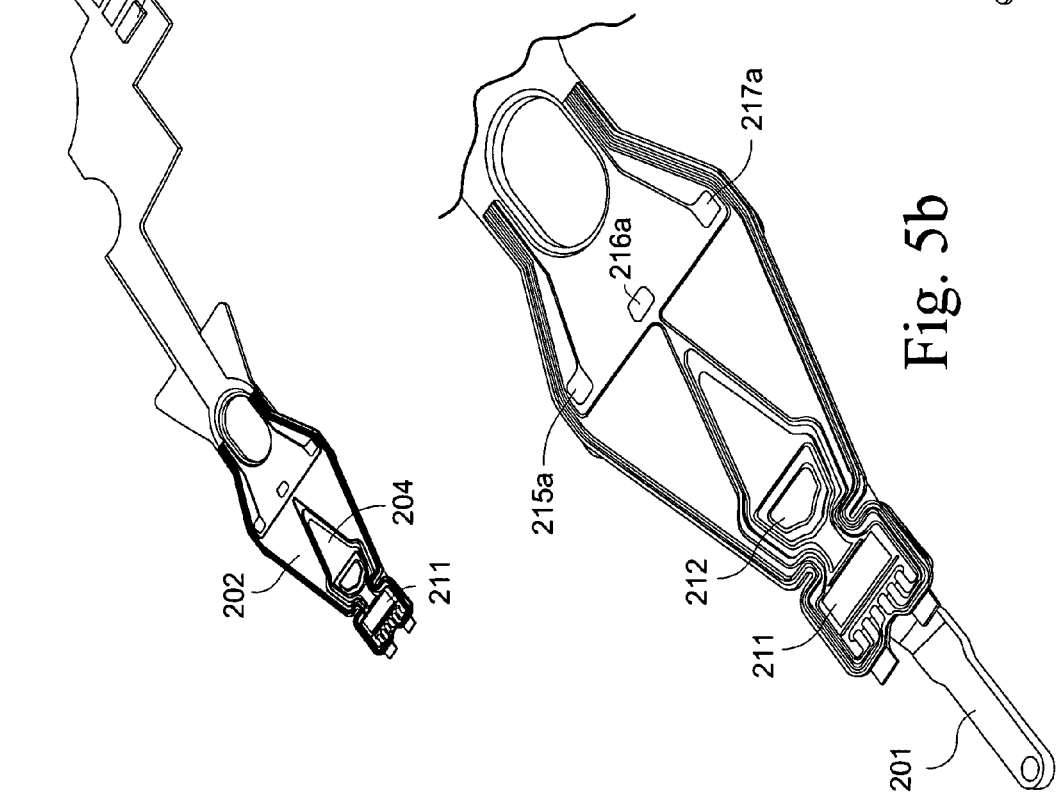
FIG. 5b shows the suspension tongue region of the assembled HGA of FIG. 5a, in accordance with an example embodiment.

FIG. 5*b* shows the suspension tongue region of the assembled HGA of FIG. 5*a*, in accordance with an example embodiment. As shown in FIG. 5*b*, the large mass around the suspension tongue is reduced and/or entirely removed. The same can be seen with reference to FIG. 3*b*, in that the large mass around the slider 103 is removed. This configuration allows better performance, such as, for example, improved shock performance, resonance transfer characteristics, rotational torque accuracy, strength, etc. When considered with FIG. 2c, it will become apparent that the slider having the substantially full mounting enables changes in the tongue structure, which may lead to similar advantages. Also, the weight between the leading edge and the trailing edge of the tongue becomes more balanced by means of, for example, a conductive material that increases the weight thereof. Still further, as noted above with respect to FIG. 2c, because the PZT element(s) is/are not underneath the edge of the slider, the chances of damage thereto are reduced. Of course, the suspension still will protrude longitudinally beyond the tip of the slider. However, the flexure itself should be located substantially fully underneath the slider.

FIGS. 6a and 6b show resonance testing data taken from certain example embodiments. In particular, FIG. 6a shows gain, and FIG. 6b show the related phase. Curves 601, 603 correspond to the resonances of the suspension base plate upon excitation of the micro-actuator, and curves 602, 604 correspond to the resonance of a PZT element. Because the slider is rotated in response to PZT actuation, reaction forces transferred to the suspension and generating different resonances are reduced (and/or potentially eliminated). Thus, for example, the gains are substantially clear at lower resonance frequencies. This may, in turn, greatly increase the TPI value of the hard disk drive (HDD).

Figure 7A:
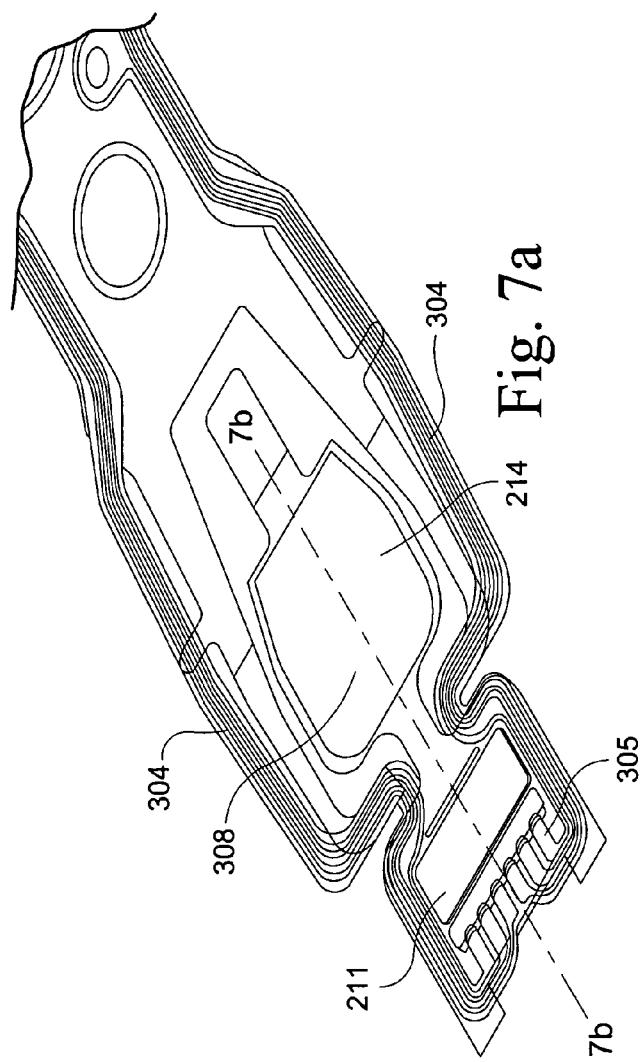
FIG. 7a is a partial perspective view of the suspension tongue region of the assembled non-DSA HGA, in accordance with an example embodiment.
Figure 7B:
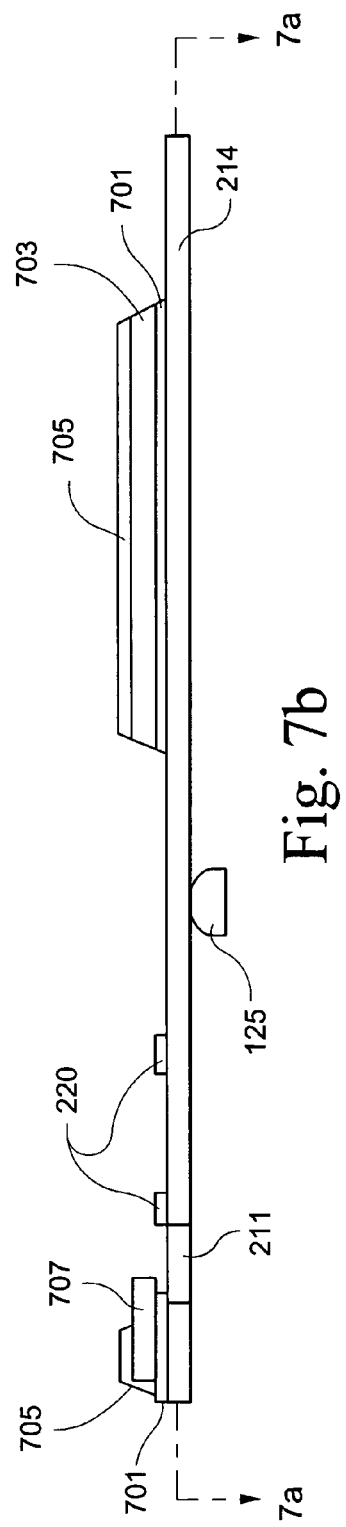
FIG. 7*b* is a cross-sectional view of the tongue region of the non-DSA HGA of FIG. 7*a* taken across the 7*b*-7*b* line.

It will be appreciated that any type of PZT element may be used in connection with the example embodiments described herein. By way of example and without limitation, such PZT elements may be ceramic PZTs, thin-film PZTs, PMN—Pt PZTs, etc. Also, it will be appreciated that the techniques described herein may be applied to dual-stage actuation (DSA) HGAs having a single PZT element, and they also may be applied to HGAs which do not have a PZT element (e.g. HGA that do not incorporate dual stage actuation, or non-DSA HGAs). In particular, FIGS. 7a and 7b show an non-DSA HGA which does not have a PZT element in accordance with an example embodiment. More particularly, FIG. 7a is a partial perspective view of the suspension tongue region of the assembled non-DSA HGA, in accordance with an example embodiment, and FIG. 7b is a cross-sectional view of the tongue region of the non-DSA HGA of FIG. 7a taken across the 7b-7b axis.

In FIG. 7b, provided on the top region of the tongue of the flexure 211 are two plots 220 (e.g. PI plots) where a mechanism for controlling the slider mounting material (e.g. an adhesive, epoxy, or the like) may be located. At the front end, a conductive layer 707 may be operably connected to the slider. It may be insulated from the top region of the tongue of the flexure 211 via a base substrate PI 701, and at least partially covered by a cover substrate PI 705. Similarly, at the bottom region of the tongue, a conductive layer 703, together with the bottom region of the flexure 214, may help to balance the weight of the top region 211 and the slider, about the dimple. It also may be insulated from the bottom region of the tongue of the flexure 214 via a base substrate PI 701, and at least partially covered by a cover substrate PI 705. A dimple 125 is shown. The weight advantageously is approximately balanced around the dimple 125, similar to as in FIG. 2c.

Figure 8:
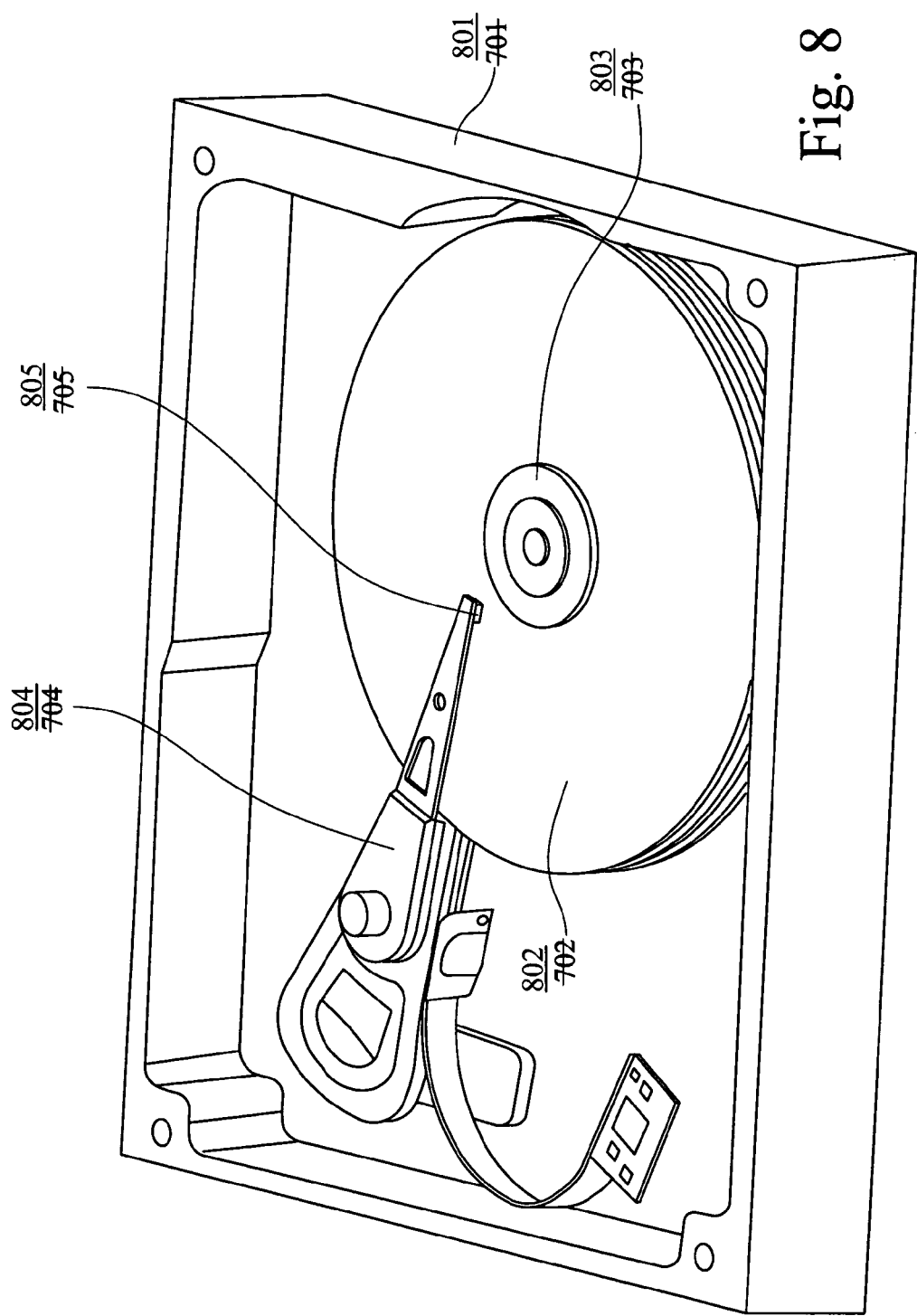
FIG. 8 is an assembled HDD incorporating an HGA having a micro-actuator, in accordance with an example embodiment.

FIG. 8 is an assembled HDD incorporating an HGA having a micro-actuator according to certain example embodiments. In brief, the HDD includes a frame 801. One or more disks 802 are spun by a spindle motor 803. A VCM 804 controls the head 805 that flies over the disk 802. One of ordinary skill in the art will clearly understand the operation of the HDD of FIG. 8, and further details are omitted to avoid confusion.

The example embodiments described herein may be advantageous for several reasons. Certain example embodiments may perform better during and after shocks, and they also may be able to withstand shocks and/or reduce the amount of damage associated therewith. Substantially balancing the weight of the tongue portion and reducing the gap between the slider and the flexure may keep the slider more stable. Previous arrangements may require a much higher accuracy slider mounting because the gap may affect the slider position (e.g. because of slider tilting), which may, in turn, affect the static attitude of the HGA. The comparatively stiffer mounting also may help achieve better shock performance, as may separating the PZT element from the edge of the slider. The potential corresponding reduction in size may provide less material to become shocked, and the costs of producing the example embodiments may be lowered (e.g. the quantity of the PZT elements per wafer may be increased). The techniques described herein also may enable high resonance performance while reducing the suspension size in the tongue region, which may, in turn, improve the HGA dynamic and static performance.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A head gimbal assembly, comprising:
a suspension including a suspension flexure located at one end of the suspension, the suspension flexure including a tongue region with a top region and a bottom region;
at least one micro-actuator mounted to a micro-actuator mounting region of the tongue region of the suspension flexure, the micro-actuator mounting region being separated from the bottom region;
at least one support formed on the micro-actuator mounting region, such that the support increases the rigidity of the suspension flexure; and
a slider having a leading edge and a trailing edge, the slider being substantially fully mounted on an insulating layer of the suspension tongue region such that the leading edge of the slider is mounted on the bottom region of the tongue region and the trailing edge of the slider is mounted on the top region of the tongue region, wherein a separation interval is formed between the micro-actuator and the slider in the direction parallel to the micro-actuator mounting region.

2. The head gimbal assembly of claim 1, wherein the top region and bottom region of the tongue region are operably coupled through a weak point, the weak point being narrower in width than the top region and bottom region of the tongue region and supported by a suspension dimple formed on the suspension flexure.

3. The head gimbal assembly of claim 1, wherein the suspension flexure is located substantially fully underneath the slider.

4. The head gimbal assembly of claim 1, further comprising a dimple formed on the suspension, the dimple supporting the suspension flexure.

5. The head gimbal assembly of claim 4, wherein the tongue region of the suspension flexure is substantially equally weighted around the dimple.

6. The head gimbal assembly of claim 4, further comprising at least one polymer layer surrounding a metal layer, the polymer layer being formed on the suspension flexure, the metal layer being suitable to substantially balance the tongue region weight about the dimple.

7. A disk drive device, comprising:
a head gimbal assembly;
a drive arm connected to the head gimbal assembly;
a disk; and,
a spindle motor operable to spin the disk;
the head gimbal assembly including:
  a suspension including a suspension flexure located at one end of the suspension, the suspension flexure including a tongue region with a top region and a bottom region;
  at least one micro-actuator mounted to a micro-actuator mounting region of the tongue region of the suspension flexure, the micro-actuator mounting region being separated from the bottom region;
  at least one support formed on the micro-actuator mounting region, such that the support increases the rigidity of the suspension flexure; and
  a slider having a leading edge and a trailing edge, the slider being substantially fully mounted on an insulating layer of the suspension tongue region such that the leading edge of the slider is mounted on the bottom region of the tongue region and the trailing edge of the slider is mounted on the top region of the tongue region, wherein a separation interval is formed between the micro-actuator and the slider in the direction parallel to the micro-actuator mounting region.

8. The disk drive device of claim 7, wherein the top region and bottom region of the tongue region are operably coupled through a weak point, the weak point being narrower in width than the top region and bottom region of the tongue region and supported by a suspension dimple formed on the suspension flexure.

9. The disk drive device of claim 7, wherein the suspension flexure is located substantially fully underneath the slider.

10. The disk drive device of claim 7, further comprising a dimple formed on the suspension, the dimple supporting the suspension flexure.

11. The disk drive device of claim 10, wherein the tongue region of the suspension flexure is substantially equally weighted around the dimple.

12. The disk drive device of claim 10, further comprising at least one polymer layer surrounding a metal layer, the polymer layer being formed on the suspension flexure, the metal layer being suitable to substantially balance the tongue region weight about the dimple.

13. A method of making a head gimbal assembly, the method comprising:
providing a suspension;
mounting a suspension flexure onto one end of the suspension, the suspension flexure including a tongue region with a top region and a bottom region;
attaching at least one micro-actuator to a micro-actuator mounting region of the tongue region of the suspension flexure, the micro-actuator mounting region being separated from the bottom region;
forming at least one support on the micro-actuator mounting region, the support being capable of increasing the rigidity of the suspension flexure; and
substantially fully mounting a slider having a leading edge and a trailing edge on an insulating layer, the leading edge of the slider being mounted on the bottom region of the tongue region and the trailing edge of the slider being mounted on the top region of the tongue region, wherein a separation interval is formed between the micro-actuator and the slider in the direction parallel to the micro-actuator mounting region.

14. The method of claim 13, wherein the suspension flexure is located substantially fully underneath the slider.

15. The method of claim 13, further comprising forming a dimple on the suspension, the dimple being capable of supporting the suspension flexure.

16. The method of claim 15, wherein the tongue region of the suspension flexure is substantially equally weighted around the dimple.

17. The method of claim 13, further comprising:
providing a metal layer; and,
forming at least one polymer layer on the suspension flexure, the at least one polymer layer surrounding the metal layer,
wherein the metal layer is configured to substantially balance the tongue region weight about the dimple.

* * * * *